United States Patent
Saito

(10) Patent No.: US 8,608,136 B2
(45) Date of Patent: Dec. 17, 2013

(54) DUST SEAL STRUCTURE FOR VALVE STEM IN ROTARY THROTTLE VALVE CARBURETOR

(75) Inventor: Tamotsu Saito, Iwate (JP)

(73) Assignee: Zama Japan Kabushiki Kaisha, Iwate (JP)

( * ) Notice: Subject to any disclaimer, the term of this patent is extended or adjusted under 35 U.S.C. 154(b) by 435 days.

(21) Appl. No.: 13/023,324

(22) Filed: Feb. 8, 2011

(65) Prior Publication Data

US 2011/0204576 A1 Aug. 25, 2011

(30) Foreign Application Priority Data

Feb. 25, 2010 (JP) .................................. 2010-040685

(51) Int. Cl.
*F02M 9/08* (2006.01)

(52) U.S. Cl.
USPC .......... 261/44.6; 261/44.8; 277/407; 277/944

(58) Field of Classification Search
USPC ........ 261/44.6, 44.8, 44.1; 277/313, 407, 944
See application file for complete search history.

(56) References Cited

U.S. PATENT DOCUMENTS

| | | | | |
|---|---|---|---|---|
| 5,261,678 A | * | 11/1993 | Takemori et al. | ............. 277/630 |
| 5,599,484 A | * | 2/1997 | Tobinai | ........................ 261/44.2 |
| 5,709,822 A | * | 1/1998 | Togashi | ........................ 261/44.2 |
| 6,378,846 B1 | * | 4/2002 | Terakado et al. | ............ 261/44.8 |
| 6,382,599 B1 | * | 5/2002 | Aihara et al. | .................... 261/37 |
| 6,769,670 B2 | * | 8/2004 | Ohgane et al. | ............... 261/44.6 |
| 6,827,337 B2 | * | 12/2004 | Terakado | ...................... 261/44.3 |
| 2005/0104235 A1 | * | 5/2005 | Sasaki et al. | ................. 261/44.6 |
| 2009/0267305 A1 | * | 10/2009 | Price et al. | ..................... 277/390 |

FOREIGN PATENT DOCUMENTS

| | | | | |
|---|---|---|---|---|
| JP | 1-294947 A | * 11/1989 | ................... | 261/44.8 |
| JP | 2005-146980 | 9/2005 | | |

* cited by examiner

*Primary Examiner* — Richard L Chiesa
(74) *Attorney, Agent, or Firm* — Kenneth S. Roberts; One LLP

(57) ABSTRACT

A dust seal structure for a valve stem in a rotary throttle valve The dust seal structure has a cylindrical throttle valve with a metering needle and a throttle through-hole, and a fuel nozzle disposed on the central axis of the throttle valve that is openable into the throttle through-hole with the metering needle inserted therein. The valve stem of the throttle valve, which protrudes at one end from the shaft hole formed in the cover body of a valve hole in the carburetor body, is caused to rotate in accordance with the operation of the accelerator pedal, whereby the throttle valve moves in the direction of a central axis thereof while rotating as a whole, and controls airflow and fuel-flow rate. A dust-proof member composed of a sealing ring is fitted between the valve stem and the shaft hole formed in the cover body.

4 Claims, 2 Drawing Sheets

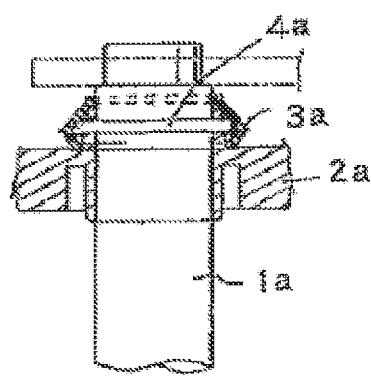

DUST SEAL STRUCTURE FOR VALVE STEM IN ROTARY THROTTLE VALVE CARBURETOR

BACKGROUND OF THE INVENTION

1. Field of the Invention

The present invention relates to a dust seal structure for a valve stem in a rotary throttle valve carburetor.

2. Description of the Related Art

There are rotary throttle valve carburetors that have a cylindrical throttle valve provided with a metering needle and a throttle through-hole, and disposed perpendicularly with respect to an air intake passage in a main body of a general-purpose carburetor used as a power source in small vehicles and portable machinery for agriculture and forestry applications. The carburetors also have a fuel nozzle disposed on the central axis of the throttle valve, made to open into the throttle through-hole, and provided with the metering needle inserted therein. The valve stem of the throttle valve, which protrudes at one end from the shaft hole formed in the cover body of the throttle hole in the carburetor body, is caused to rotate in accordance with the operation of the accelerator pedal, whereby the throttle valve moves in the direction of its central axis while rotating as a whole, and controls the airflow rate and the fuel flow rate.

Since the throttle valve in the rotary throttle valve carburetor described above moves in the axial direction and controls the airflow rate and the fuel flow rate while rotating as a whole, any foreign matter that passes through the gap between the valve stem and the shaft hole formed in the cover body and that enters the operating part of the valve stem of the throttle valve, the cam mechanism that causes the throttle valve to move in the axial direction, or other components can prevent the smooth operation of a throttle valve lever, and the performance of the engine may be reduced if air leaks through the gap. A dust-proofing member is fitted in order to block the gap formed between the valve stem and the shaft hole formed in the cover body.

There is known in the prior art a technique whereby a cylindrically shaped dust-proof member formed from rubber or another elastic material having adhesive properties is disposed between an operating lever attached to a distal end of a valve stem and the cover body. However, as described above, the valve stem moves in the direction of its central axis while rotating together with the throttle valve to control the airflow rate and the fuel flow rate. Particularly in an idling state, the throttle valve is positioned at the lowermost point in the axial direction, and the distance between the operating lever and shaft support part is at a minimum. If the dust-proof member is kept in this state for a prolonged period of time, it will consistently be placed under crushing pressure, causing it to degrade and deform.

A problem has accordingly been presented in that the dust-proof member first extends fully in the axial direction but then becomes incapable of maintaining adequate elasticity at the extended length, causing the part anchored to the cover body side to detach and the dust-proof effect to be compromised, when the dust-proof member degrades and deforms, and the throttle valve ascends with increased engine speed, and particularly when the engine speed increases, the throttle fully is open, and the maximum amount of fuel is injected.

A dust seal structure for a valve stem in a rotary throttle valve carburetor that overcomes the above problem is disclosed in the Japanese Laid-open Patent Publication No. 2005-146980.

In the disclosed dust seal structure, a dust-proof seal $3a$ composed of an elastomer material for dust-proofing the gap between the valve stem $1a$ of the throttle valve and the cover member $2a$ for supporting the valve stem is formed in the shape of a cylinder that is widened at the center, an outward-facing flange part $4a$ is provided in the central region of the valve stem $1a$, and the dust-proof seal $3a$ is caused to engage with and become attached to the valve stem $1a$ and the cover member $2a$ at three points; i.e., at either end of the dust-proof seal $3a$ and at the central widened part, as shown in FIG. 4.

This dust seal structure for a valve stem can maintain its dust-proofing properties more reliably than can the prior art model involving engagement at two points; i.e., the upper and lower end. Since the two ends of the dust-proof seal are reduced in diameter relative to the central part, the open end on the shaft support side can be prevented from moving past the part projecting outward in a radial direction, and a state can be assumed in which the gap between the turning support shaft and the shaft support is covered at all times by the dust-proof seal. The dust-proofing function of the dust-proof seal is improved along with durability, dispensing with the need to replace the dust-proof seal.

However, the elastomeric dust-proof seal disclosed in the above patent publication is disposed on the outer perimeter of the valve stem so as to be exposed to ambient air, and degrades under ultraviolet radiation from sunlight, exhaust emissions, and other aspects of the operating environment while in use. The repeated episodes of extending and contracting in accompaniment with the throttle valve moving in the axial direction during use also causes degradation, so that the dust-proof function is compromised, and the dust-proof seal must be replaced. Accordingly, problems are presented in that maintenance costs accrue, or inspections increase in complexity. A further problem is presented in that the length of the valve stem that protrudes from the cover body must be at least the height of the dust-proof seal, and it is not possible to reduce the mounting dimension in the height direction.

SUMMARY OF THE INVENTION

In order to solve the aforementioned problems, it is an object of the present invention to provide a dust seal structure for a valve stem in a rotary throttle valve carburetor that is not degraded by the effect of ultraviolet radiation or exhaust emissions, that is highly durable and requires little maintenance, and that allows a further reduction in the mounting dimension with respect to the height direction.

In view of the above, the present invention provides a dust seal structure for a valve stem in a rotary throttle valve carburetor having a cylindrical throttle valve provided with a metering needle and a throttle through-hole, and disposed perpendicularly with respect to an air intake passage in a carburetor main body; and a fuel nozzle disposed on the central axis of the throttle valve, made to open into the throttle through-hole, and provided with the metering needle inserted therein, so that the valve stem of the throttle valve, which protrudes at one end from the shaft hole formed in the cover body of the valve hole in the carburetor body, is caused to rotate in accordance with the operation of the accelerator pedal, whereby the throttle valve moves in the direction of a central axis thereof while rotating as a whole to control an airflow rate and a fuel flow rate; wherein a dust-proof member composed of a sealing ring is fitted between the valve stem and a shaft hole formed in the cover body.

Thus, placing the dust-proof member in the shaft hole part provided to the cover body of the valve stem prevents the dust-proof member from coming into contact with the open air, making it possible to prevent degradation due to ultraviolet radiation from sunlight or exhaust emissions. Moreover, the size can be reduced further because no tolerance is needed for mounting the valve stem in the axial direction.

When an annular groove is formed in the outer peripheral wall of the valve stem and a sealing ring is fitted into the annular groove, the sealing ring is firmly fitted and retained in a prescribed position in the valve stem, and the sealing effect can be sustained without any risk of displacement despite the rotation and upward and downward movement of the valve stem.

The valve stem and the throttle valve will rotate concentrically in a case where the annular groove provided to the outer peripheral wall of the valve stem is formed coaxially with respect to the valve stem and the throttle valve, enabling a smooth operation.

In the dust seal structure for a valve stem in a rotary throttle valve carburetor according to the present invention, a dust-proof member is fitted to a widened part formed on a surface side of the cover body of the shaft hole formed in the cover body, and a hollow discoid hold-down member provided with a centrally located insertion hole for the valve stem is mounted on the widened part from the surface side of the cover body, whereby machining can be simplified and the dust-proof member can be replaced with ease.

According to the present invention, exceptional durability is achieved, little maintenance is required, and the vertical mounting dimension can be made even smaller in a dust-proof member composed of a sealing ring between the valve stem and the shaft hole formed in the cover body.

BRIEF DESCRIPTION OF THE DRAWINGS

FIG. 4 is a longitudinal sectional view showing the main parts of a prior art example.

DESCRIPTION OF THE PREFERRED EMBODIMENTS

Embodiments of the present invention are described below with reference to the drawings.

Figure 1:
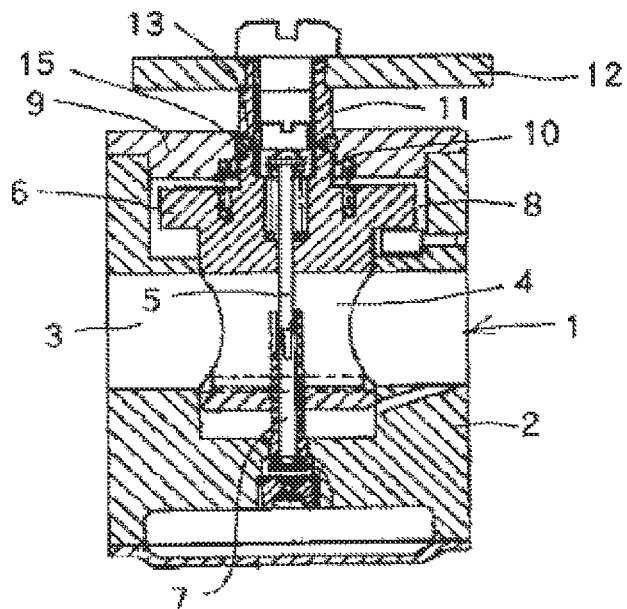
FIG. 1 is a longitudinal sectional view showing an example of a rotary throttle valve carburetor according to an embodiment of the present invention.
Figure 2:
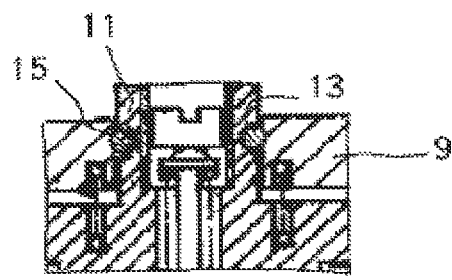
FIG. 2 is a partially enlarged fragmentary longitudinal sectional view of FIG. 1.

FIGS. 1 and 2 show a very typical rotary throttle valve carburetor and associated area having a dust seal structure for a valve stem according to the present embodiment. The rotary throttle valve carburetor 1, which controls the airflow rate and the fuel flow rate, has a cylindrical throttle valve 6 provided with a metering needle 5 and a throttle through-hole 4, and disposed perpendicularly with respect to an air intake passage 3 in a carburetor main body 2, and further has a fuel nozzle 7 disposed on the central axis of the throttle valve 6, made to open into the throttle through-hole 4, and provided with the metering needle 5 inserted therein; wherein the throttle valve 6 moves in the direction of a central axis thereof while rotating as a whole to control an airflow rate and a fuel flow rate via a throttle operating lever 12 that causes the valve stem 11 of the throttle valve 6 to rotate in accordance with the operation of the accelerator pedal by a driver, the valve stem 11 protruding at one end from the shaft hole 10 formed in the cover body 9 of the valve hole 8 in the carburetor body.

An annular groove 13 is formed in the area of the shaft hole 10 formed in the cover body 9 around the valve stem 11, and a dust-proof member 15 composed of a sealing ring having a suitable degree of resilience and airtightness, such as a rubber element, is fitted in the annular groove 13. The sealing ring may be an O-ring having a circular cross-section, but this is not the only option, and a sealing ring having, e.g., a rhomboid or elliptical cross-section or the like may also be used.

In the present embodiment, the dust-proof member 15 composed of an O-ring is fitted between the valve stem 11 and the shaft hole 10 formed in the cover body 9, whereby foreign matter is prevented from passing through the gap between the valve stem 11 and the shaft hole 10, and the smooth action of the throttle valve lever is not impeded. In particular, the dust-proof member 15 is consistently blocked by the shaft hole 10 formed in the cover body 9. Therefore, there is no effect from ultraviolet radiation and engine exhaust emissions, and there is no concern that degrading will be caused by these factors.

In the aforementioned embodiment, the annular groove 13 formed in the outer peripheral surface of the valve stem 11 is formed coaxially with the valve stem 11 and the throttle valve 6. Therefore, the throttle valve 6 performs smooth rotation and vertical movement, resulting in the improved functioning and durability of the throttle valve 6.

When the annular groove 13 is formed in the valve stem 11 so that the annular groove 13 can be formed coaxially with the valve stem 11 and the throttle valve 6, the annular groove 13 is formed by cutting while the valve stem 11 and the throttle valve 6 are caused to rotate as a single unit around their core axis. If necessary, the outer peripheral surface of the throttle valve 6 is machined by cutting while kept in the above state so that the cross-section will form a true circle. In the particular case that the valve stem 11 and the throttle valve 6 are formed separately, it is possible to coaxially machine the core shafts of the valve stem 11 and the throttle valve 6, including the annular groove 13, during formation of the annular groove 13, making it possible to form a high-precision throttle valve 6.

In the present embodiment, using the dust-proof member 15 as an O-ring or another sealing ring having a suitable degree of resilience and airtightness, such as a rubber element, limits the movement of the valve stem 11 to rotation and vertical movement along the wall surface of the shaft hole 10, even when the valve stem in the axial direction in concert with the operation of the accelerator pedal. The fact that no extending or contracting is experienced with the structure, in contrast with the prior art, means that there is no particular concern of degradation.

Figure 3:
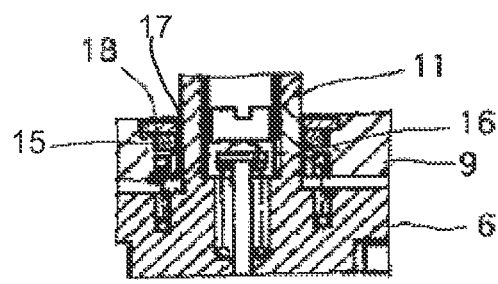
FIG. 3 is a partially enlarged fragmentary longitudinal sectional view showing the main part of another embodiment of the present invention.

FIG. 3 shows another embodiment of the present invention. The basic operation and effect are the same, as is the fact that the dust-proof member 15 is composed of a sealing ring having a suitable degree of resilience and airtightness, such as a rubber material element, but the mounting means is different.

Namely, an annular groove 13 designed to accommodate the sealing ring is not formed by machining in the valve stem 11 in the present embodiment the way it is formed in the embodiment shown in FIG. 1. The dust-proof member 15 is inserted into the mounting space formed, for example, in the bottom surface of a circular widened part 16 provided to the surface of the cover body 9 in continuation of the shaft hole 10 formed in the cover body 9, and a hollow discoid hold-down member 18 provided with a centrally located insertion hole 17 for the valve stem 11 is mounted above the dust-proof member on the widened part 16 from the surface side of the cover body 9.

According to the present embodiment, there is no need to form an annular groove 13 in the valve stem 11, as described above. Therefore, machining is simple and there is no machining-induced reduction in strength. Moreover, the dust-proof member 15 can be readily mounted and replaced. In particular, degradation or damage can be inspected in a very simple manner.

Press-fitting, screw-fixing, or other suitable means may be employed to mount the hold-down member 18 on the cover body 9.

KEY

1 Rotary throttle valve carburetor
2 Carburetor body
3 Air intake passage
4 Throttle valve hole
5 Metering needle
6 Throttle valve
7 Fuel nozzle
8 Throttle hole
9 Cover body
10 Shaft hole
11 Valve stem
12 Throttle valve lever
13 Annular groove
15 Dust-proof cover
16 Widened part
18 Hold-down member

What is claimed is:

1. A dust seal structure for a valve stem in a rotary throttle valve carburetor, having a cylindrical throttle valve provided with a metering needle and a throttle through-hole, and disposed perpendicularly with respect to an air intake passage in a carburetor main body; and a fuel nozzle disposed on the central axis of the throttle valve, made to open into the throttle through-hole, and provided with the metering needle inserted therein, so that the valve stem of the throttle valve, which protrudes at one end from the shaft hole formed in the cover body of the valve hole in the carburetor body, is caused to rotate in accordance with the operation of the accelerator pedal, whereby the throttle valve moves in the direction of a central axis thereof while rotating as a whole, and controls an airflow rate and a fuel flow rate;

wherein a dust-proof member composed of a sealing ring is fitted within the shaft hole formed in the body between the valve stem and the shaft hole.

2. A dust seal structure for a valve stem in a rotary throttle valve carburetor, having a cylindrical throttle valve provided with a metering needle and a throttle through-hole, and disposed perpendicularly with respect to an air intake passage in a carburetor main body; and a fuel nozzle disposed on the central axis of the throttle valve, made to open into the throttle through-hole, and provided with the metering needle inserted therein, so that the valve stem of the throttle valve, which protrudes at one end from the shaft hole formed in the cover body of the valve hole in the carburetor body, is caused to rotate in accordance with the operation of the accelerator pedal, whereby the throttle valve moves in the direction of a central axis thereof while rotating as a whole, and controls an airflow rate and a fuel flow rate;

wherein a dust-proof member composed of a sealing ring is fitted between the valve stem and the shaft hole formed in the cover body, and wherein the sealing ring is fitted into an annular groove formed in an outer peripheral surface of the valve stem.

3. The dust seal structure for a valve stem in a rotary throttle valve carburetor as recited in claim 2, wherein the annular groove formed in the outer peripheral surface of the valve stem is formed coaxially with respect to the valve stem and the throttle valve.

4. A dust seal structure for a valve stem in a rotary throttle valve carburetor, having a cylindrical throttle valve provided with a metering needle and a throttle through-hole, and disposed perpendicularly with respect to an air intake passage in a carburetor main body; and a fuel nozzle disposed on the central axis of the throttle valve, made to open into the throttle through-hole, and provided with the metering needle inserted therein, so that the valve stem of the throttle valve, which protrudes at one end from the shaft hole formed in the cover body of the valve hole in the carburetor body, is caused to rotate in accordance with the operation of the accelerator pedal, whereby the throttle valve moves in the direction of a central axis thereof while rotating as a whole, and controls an airflow rate and a fuel flow rate;

wherein a dust-proof member composed of a sealing ring is fitted between the valve stem and the shaft hole formed in the cover body, and wherein the dust-proof member is positioned in a widened part formed in the cover body in continuation of the shaft hole formed in the cover body, and a hollow discoid hold-down member is mounted on the widened part from the surface side of the cover body, the hollow discoid hold-down member includes a centrally located insertion hole for the valve stem.

* * * * *